United States Patent [19]
Steiss et al.

[11] Patent Number: 6,009,516
[45] Date of Patent: Dec. 28, 1999

[54] PIPELINED MICROPROCESSOR WITH EFFICIENT SELF-MODIFYING CODE DETECTION AND HANDLING

[75] Inventors: Donald E. Steiss, Richardson; Timothy D. Anderson, Dallas; Sanjive Agarwala, Richardson, all of Tex.

[73] Assignee: Texas Instruments Incorporated, Dallas, Tex.

[21] Appl. No.: 08/951,662

[22] Filed: Oct. 16, 1997

Related U.S. Application Data

[60] Provisional application No. 60/029,299, Oct. 21, 1996.

[51] Int. Cl.$^6$ ..................................................... G06F 9/38
[52] U.S. Cl. ........................................... 712/244; 712/205
[58] Field of Search .............................. 395/800.42, 567, 395/568, 381, 382, 383, 580, 581, 582, 185.03, 670; 712/42, 226, 227, 205, 206, 207, 233, 234, 235, 244; 714/50; 709/1; 711/213, 125, 169

[56] References Cited

U.S. PATENT DOCUMENTS

| | | | |
|---|---|---|---|
| 3,728,690 | 4/1973 | Holtey et al. | 395/567 |
| 4,095,278 | 6/1978 | Kihara | 395/567 |
| 4,573,119 | 2/1986 | Westheimer et al. | 380/4 |
| 4,760,519 | 7/1988 | Papworth et al. | 395/393 |
| 4,953,121 | 8/1990 | Muller | 395/588 |
| 5,125,083 | 6/1992 | Fite et al. | 395/383 |
| 5,255,369 | 10/1993 | Dann | 709/214 |
| 5,386,521 | 1/1995 | Saitoh | 395/383 |
| 5,434,987 | 7/1995 | Abramson et al. | 395/567 |
| 5,459,847 | 10/1995 | Okamura | 711/213 |
| 5,471,672 | 11/1995 | Reddy et al. | 395/296 |
| 5,564,028 | 10/1996 | Swoboda et al. | 395/568 |
| 5,568,631 | 10/1996 | Webb | 712/248 |
| 5,625,787 | 4/1997 | Mahin et al. | 395/380 |
| 5,636,374 | 6/1997 | Rodgers et al. | 395/571 |
| 5,692,167 | 11/1997 | Grochowski et al. | 395/567 |
| 5,742,791 | 4/1998 | Mahalingaiah et al. | 711/146 |
| 5,822,616 | 10/1998 | Hirooka et al. | 395/842 |
| 5,826,073 | 10/1998 | Ben-Meir et al. | 395/567 |

OTHER PUBLICATIONS

Wilde, Program Analysis by Digital Computer, Technical Report, Massachussetts Institute of Technology, Laboratory for Computer Science, Aug. 1967.

Liangchuan Hsu, A Robust Foundation for Binary Translation of (X86) Code, Technical Report, University of Illinois at Urbana–Champaign, Jul. 12, 1998.

*Primary Examiner*—Albert De Cady
*Assistant Examiner*—Esaw Abraham
*Attorney, Agent, or Firm*—Rebecca Mapstone Lake; Richard L. Donaldson

[57] ABSTRACT

A microprocessor (10) and system (2) are disclosed, in which capability for the detection and handling of modifications of instructions potentially in the pipeline is implemented. The microprocessor (10) includes a self-modifying code (SMC) unit (50) that includes a fetch address window maintenance unit (52), a write comparator (54) associated with each load/store unit (40) in the microprocessor (10) that performs writebacks to memory (16, 11, 5), and a shared write comparator (55). The fetch address window maintenance unit (52) includes a minimum latch (60) that stores the lowest fetch address since a pipeline flush or machine reset, and a maximum latch (62) that stores the highest fetch address since flush or reset, and updates the minimum and maximum latches (60, 62) upon detecting that the current fetch address (LASTFA) falls outside of the current window. The write comparators (54) compare each new writeback address (LSxADR) to the minimum and maximum fetch addresses (MINFA, MAXFA) from the minimum and maximum latches (60, 62), respectively. In response to the writeback address (LSxADR) falling within the window, an exception sequence is initiated to flush the pipeline. Write comparators (54, 55) also compare the current fetch address (LASTFA) against the current writeback address and against the addresses of pending, but not completed, writebacks, to determine if a conflict exists between the fetched instruction and the pending writebacks.

21 Claims, 5 Drawing Sheets

PIPELINED MICROPROCESSOR WITH EFFICIENT SELF-MODIFYING CODE DETECTION AND HANDLING

This application claims priority under 35 USC 119(e)(1) of the provisional application No. 60/029,299, filed Oct. 21, 1996.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of microprocessor integrated circuits, and is more specifically directed to pipelined microprocessors capable of executing self-modifying programs.

Most modern microprocessors are configured according to so-called pipelined architectures. In a pipelined microprocessor, multiple sequential program instructions are processed simultaneously along various stages of execution from instruction fetch through execution and writeback; in other words, later instructions (in program order) are fetched prior to completion of the execution of earlier instructions. Because of pipelining, the effective rate at which instructions are executed by a microprocessor can approach one instruction per machine cycle in a single pipeline microprocessor, even though each individual instruction may require multiple machine cycles for processing from fetch through execution and writeback. So-called superscalar architectures effectively have multiple pipelines operating in parallel, providing even higher theoretical performance levels.

Many popular microprocessors provide the user with a high level of programming flexibility by permitting the use of "self-modifying code". Self-modifying code refers to a programming technique in which program instructions are modified by the program itself. In other words, the result of the execution of an instruction in the program may modify, via writeback of the results, the instruction code of later instructions in the program. Self-modifying code thus provides the programmer with a high degree of flexibility in microprocessor-based computer programs. The technique of self-modifying code has become widespread in recent years, because of the high degree of program efficiency that may be obtained through its use.

The modification of program instructions is not difficult for modern microprocessors, so long as the program instruction being modified is resident in memory and has not yet entered the pipeline. However, most modern microprocessors, such as those commonly referred to as "x86-architecture microprocessors" permit modification of any instruction at any time, without any sort of "serializing" or "synchronization" instruction to avoid modification of instructions in the pipeline. These microprocessors must therefore have the ability to detect whether an instruction that is the target of a self-modification has already entered the pipeline at the time that the modification is generated, and to take action to ensure that the modified version of the instruction (and not the original version) is the code that is actually executed. Otherwise, program errors will result from the execution of an incorrect instruction.

Conventional microprocessors implement this capability through use of a table that stores a copy of the instruction address of each instruction that has been fetched into the pipeline. The destination address of each writeback is compared to each entry in the table to determine if the writeback is a modification to an instruction in the pipeline. If so, the pipeline is flushed, the instruction code is modified, and execution begins again using the modified instruction. It has been observed in connection with the present invention, however, that significant chip area and other resources are consumed in the implementation of such a table, especially in superscalar architectures where four or more pipelines are in place, and also especially in deep pipelines having seven or more stages.

BRIEF SUMMARY OF THE INVENTION

The present invention may be implemented into a microprocessor with self-modifying code capability, by way of a detection circuit with minimum and maximum fetch address registers. The minimum and maximum fetch address registers store the highest and lowest linear addresses of instructions that have been fetched since the last pipeline flush, and are updated as appropriate upon each fetch. At the writeback stage, the destination address of the write operation is compared against the minimum and maximum fetch addresses stored in the registers to detect if an instruction in the pipeline is possibly the destination of the writeback; if so, the pipeline is flushed, the writeback is effected, and execution of the program begins again.

According to another aspect of the present invention, the microprocessor is operable to queue a series of writebacks, so that execution does not halt due to a wait in the writeback. The destination addresses of all pending and queued writebacks are stored in a series of writeback address registers. The address of each instruction is compared, at fetch, against the contents of the writeback address registers, to detect the fetching of an instruction from memory prior to its modification by the result of an executed instruction. An exception is issued in the event of such detection to allow modification of the code and resumption of the proper program sequence.

It is an object of the present invention to provide a microprocessor with the capability of detecting self-modifying code conflicts with instructions in the pipeline, with a minimum of overhead hardware.

It is a further object of the present invention to provide such a microprocessor in which self-modifying code conflicts between completed, but not yet written, writebacks and newly fetched instructions are prevented.

It is a further object of the present invention to provide such a microprocessor in which the address comparisons performed in the conflict detection process do not substantially impact processor performance.

It is a further object of the present invention to provide such a microprocessor in which the comparison hardware overhead is minimized.

Other objects and advantages of the present invention will be apparent to those of ordinary skill in the art having reference to the following specification together with its drawings.

DETAILED DESCRIPTION OF THE INVENTION

Figure 1:
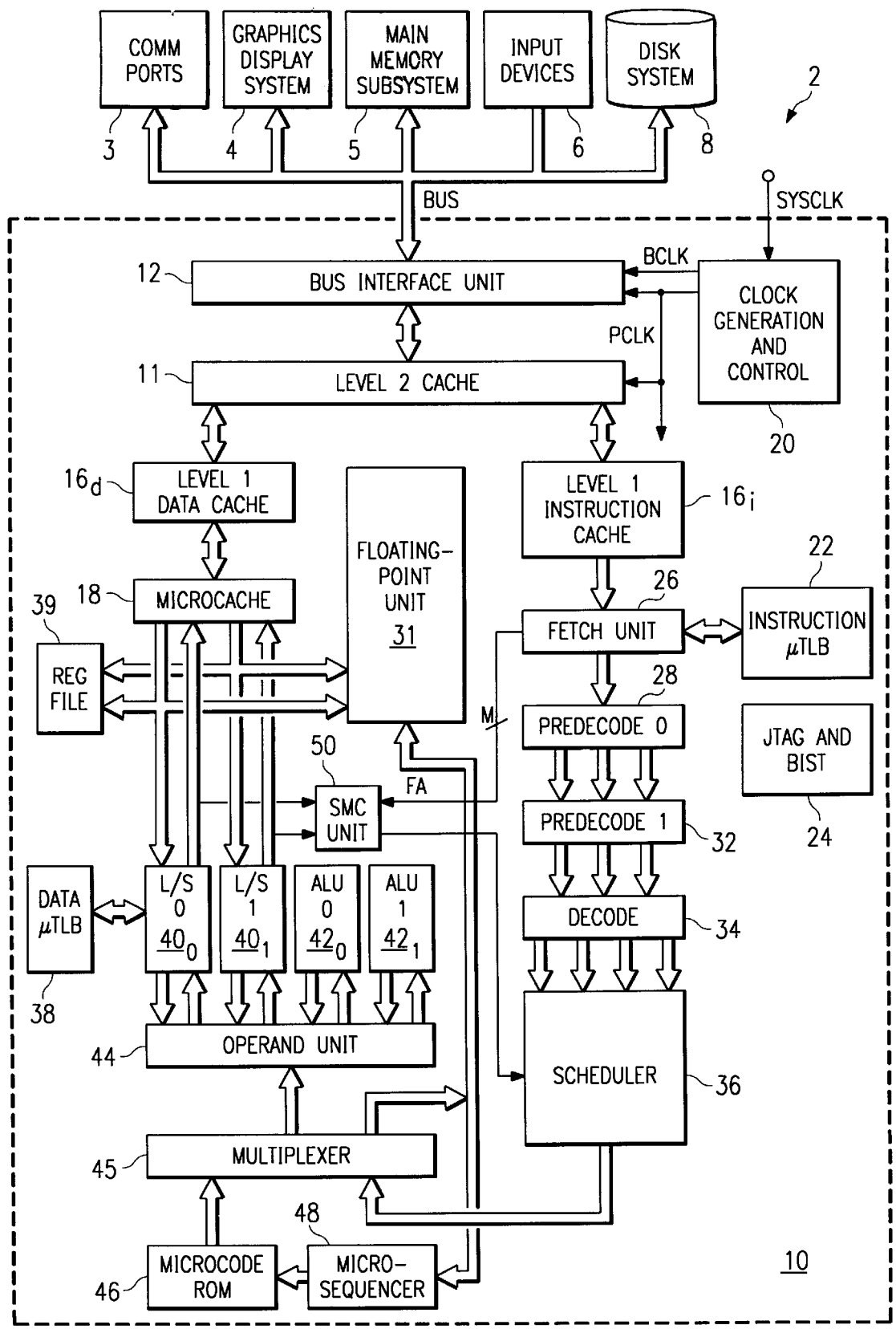
FIG. 1 is an electrical diagram, in block form, of a microprocessor and system according to the preferred embodiment of the invention.

Referring to FIG. 1, an exemplary data processing system 2, including an exemplary superscalar pipelined microprocessor 10, and constructed according to the preferred embodiment of the invention, will now be described. It is to be understood that the architecture of system 2 and of microprocessor 10 is described herein by way of example only, as it is contemplated that the present invention may be utilized in microprocessors and systems of various architectures. It is therefore contemplated that one of ordinary skill in the art, having reference to this specification, will be readily able to implement the present invention in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 10, as shown in FIG. 1, is connected to other system devices by way of external bus BUS. While external bus BUS is shown as a single bus in this example, it is of course contemplated that external bus BUS may represent multiple buses having different speeds and protocols, for example as is known in conventional computers utilizing the PCI local bus architecture. System 2 contains such conventional subsystems as communication ports 3 (including modem ports and modems, network interfaces, and the like), graphics display system 4 (including video memory, video processors, a graphics monitor), main memory system 5 which is typically implemented by way of dynamic random access memory (DRAM), input devices 6 (including keyboard, a pointing device, and the interface circuitry therefor), and disk system 8 (which may include hard disk drives, floppy disk drives, and CD-ROM drives). It is therefore contemplated that system 2 of FIG. 1 corresponds to a conventional desktop computer or workstation, as are now common in the art. Of course, other system implementations of microprocessor 10 can also benefit from the present invention, as will be recognized by those of ordinary skill in the art.

Microprocessor 10 includes bus interface unit (BIU) 12 connected to external bus BUS, which controls and effects communication between microprocessor 10 and the external elements in system 2. BIU 12 includes the appropriate control and clock circuitry to perform this function, including write buffers for increasing the speed of operation, and timing circuitry so as to synchronize the results of internal microprocessor operation with bus BUS timing constraints. Microprocessor 10 also includes clock generation and control circuitry 20 which, generates clock phases based upon system clock SYSCLK; in this example, clock generation and control circuitry 20 generates bus clock BCLK which is the controlling clock signal for bus operations upon external bus BUS, and core clock PCLK which is the controlling clock signal for internal operation of microprocessor 10.

As is evident in FIG. 1, microprocessor 10 has three levels of internal cache memory, with the highest of these as level 2 cache 11, which is connected to BIU 12 by way of an internal bus. In this example, level 2 cache 11 is a unified cache, and is configured to receive all cacheable data and cacheable instructions from bus BUS via BIU 12, such that much of the bus traffic presented by microprocessor 10 is accomplished via level 2 cache 11. Of course, microprocessor 10 may also effect bus traffic around cache 11, by treating certain bus reads and writes as "not cacheable". Level 2 cache 11, as shown in FIG. 1, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 1, microprocessor 10 is of the superscalar type, and thus includes multiple execution units. These execution units include two ALUs $42_0$, $42_1$, for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer ($\mu$TLB) 38 is provided to translate logical data addresses into physical addresses, in the conventional manner.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units (including FPU 31) |
| OP | Operand: This stage retrieves the register operands indicated by the AOps |
| EX | Execute: This stage runs the execution units according to the AOps and the retrieved operands |
| WB | Write-back: This stage stores the results of the execution in registers or in memory |

Referring back to FIG. 1, the pipeline stages noted above are performed by various functional blocks within microprocessor 10. Fetch unit 26 generates instruction addresses from the instruction pointer by way of instruction microtranslation lookaside buffer ($\mu$TLB) 22, for application to level 1 instruction cache $16_i$. Fetch unit 26 may be implemented in the conventional manner known in the art, or may include additional functionality useful in branch prediction, as described, for example, in U.S. Provisional Application No. 60/008,168, filed Oct. 31, 1995, commonly assigned herewith, and incorporated herein by this reference. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multi-byte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions, and multi-cycle instructions (such as REP instructions, and instructions that PUSH and POP all registers).

Microprocessor 10 also includes circuitry 24 for controlling the operation of JTAG scan testing, and of certain built-in self-test (BIST) functions, ensuring the validity of the operation of microprocessor 10 upon completion of manufacturing, and upon resets and other events.

According to this embodiment of the invention, microprocessor 10 also includes self-modifying code (SMC) unit 50, which is control circuitry for detecting and handling instances of potential modification, by one of the execution units, of the instruction code of instructions which may be in the pipeline at the time of modification. As illustrated in FIG. 1 for this embodiment of the invention, SMC unit 50 is connected to receive fetch addresses on lines FA from fetch unit 26, and also to receive write addresses from load/store units 40. SMC unit 50 has control line outputs applied to scheduler 36 for effecting exceptions. According to the preferred embodiment of the invention, exceptions are used to ensure that, upon detection of self-modifying code (SMC), the modified instructions are retrieved from memory and executed, and that the out-of-date versions of the modified instructions are not executed. Exception handling mechanisms permit the operation that initiated the code modification to complete execution, or alternatively, in the case where the instruction that initiated the code modification has already completed execution, allow the executing instruction or instructions to complete execution. In either case, the exception causes the instruction pipeline to be flushed, and the instruction pipeline is restarted at the address of the next instruction to be executed.

Several classes of exceptions are known in the art. For example, a fault is an exception that stops execution immediately, upon completion of the current atomic operation (AOp). A trap is a request that prevents completion of all instructions in the pipeline that are later (in program order) than the instruction signaling the trap. An interrupt is a special type of trap that, when issued, prevents the completion of all instructions that are not currently in execution; as such, an interrupt is not associated with a particular instruction in the pipeline. It is contemplated that the present invention may be implemented by using exceptions of any one of these types, and as such the term "exceptions" will be used in the following description to refer to events and requests that initiate flushing of the instruction pipeline upon detection of possible self-modifying code conflicts. As will become apparent from the following description, however, the use of traps (both associated and not associated with an initiating instruction) is preferable in this embodiment of the invention, considering that microprocessor 10 is an in-order execution machine; the use of faults, rather than traps, may be preferred for architectures that involve out-of-order processing.

Figure 2:
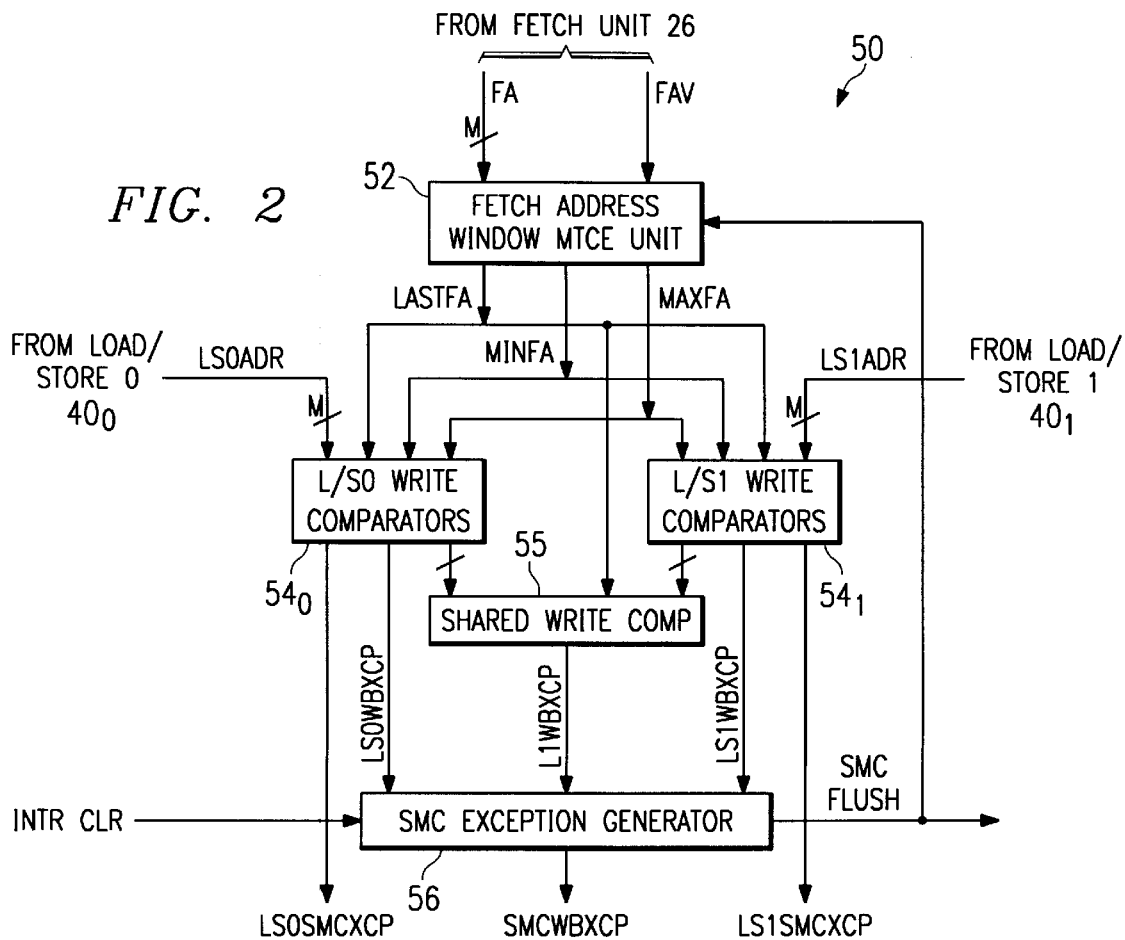
FIG. 2 is an electrical diagram, in block and schematic form, of the self-modifying code control circuitry according to the preferred embodiment of the invention.

Referring now to FIG. 2, the construction of SMC unit 50 will now be described. SMC unit 50 according to this embodiment of the invention includes fetch address window maintenance unit 52, which receives the fetch address on lines FA from fetch unit 26 (as shown in FIG. 1), along with a fetch address valid signal on line FAV indicating when the fetch address is valid. As will be described in further detail hereinbelow, fetch address window maintenance unit 52 maintains an indication of the range of linear fetch addresses for instructions that have been fetched since the last pipeline flush. This range of addresses thus will identify the addresses that are potentially in the pipeline at that time; conversely, any address that is outside of the range of addresses stored in fetch address window maintenance unit 52 cannot correspond to an instruction currently in the pipeline. Fetch address window maintenance unit 52 generates outputs indicating the last fetch address (on lines LASTFA), the highest linear address value fetched since the last flush (on lines MAXFA), and the lowest address value fetched since the last flush (on lines MINFA). Fetch address window maintenance unit 52 also receives a signal on line SMCFLUSH, from SMC exception generator 56, responsive to which the range of addresses stored by fetch address window maintenance unit 52 is reset.

Figure 3:
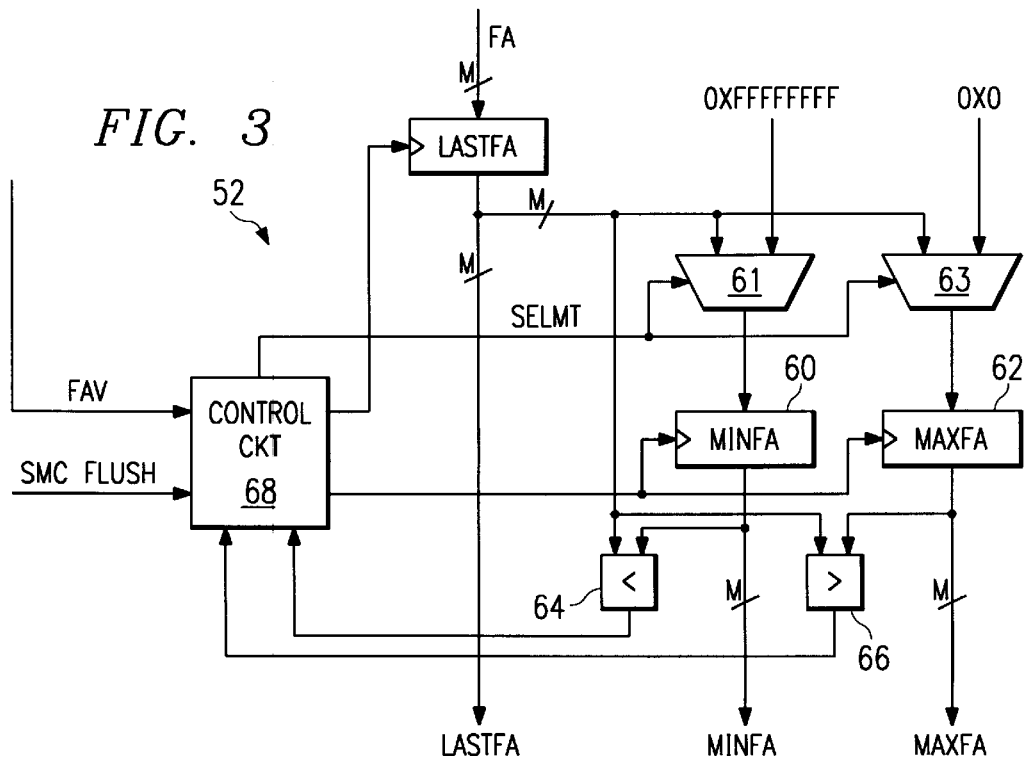
FIG. 3 is an electrical diagram, in block and schematic form, of the fetch address window maintenance unit in the self-modifying code control circuitry of FIG. 2 according to the preferred embodiment of the invention.

Referring now to FIG. 3, the construction of fetch address window maintenance unit 52 will now be described in detail. Fetch address maintenance unit 52 includes latch 58, connected to receive the fetch address from lines FA and to store the most recent value thereupon under the control of control circuit 68. Latch 60 stores the lowest instruction address fetched since the last pipeline flush, for presentation on lines MINFA to write comparators 54; similarly, latch 62 stores the highest instruction address fetched since the last pipeline flush, for presentation on lines MAXFA to write comparators 54. Each of latches 58, 60, 62 are controlled by load signals from control circuit 68. Multiplexer 61 receives the most recent fetch address from latch 58 on lines LASTFA and a high limit value, which is preferably the highest address in the memory space of microprocessor 10 (e.g., 0xFFFFFFFF$_h$), and selects one or the other for application to latch 60, under the control of control circuit 68 via line SELMT; control circuit 68 controls multiplexer 61 to select the high limit value upon pipeline flush or reset of microprocessor 10, to initialize latch 60 prior to the first fetch thereafter. Similarly, multiplexer 63 also receives the most recent fetch address from latch 58 on lines LASTFA at one input, and receives a low limit value, preferably the lowest address in the memory space of microprocessor 10 (e.g., $0_h$), at its other input. Multiplexer 63 is similarly controlled by the signal from control circuit 68 on line SELMT to select the low limit value and initialize latch 62 prior to the first instruction fetch after pipeline flush or machine reset.

Fetch address window maintenance unit 52 also includes comparators 64, 66, each of which receive the most recent fetch address from latch 58 on lines LASTFA. Less-than comparator 64 also receives the contents of latch 60 on lines MINFA, and generates a signal to control circuit 68 responsive to the address value on lines LASTFA being less than the lowest previously-fetched address value as stored in latch 60. Similarly, greater-than comparator 66 receives the contents of latch 62 on lines MAXFA, and generates a signal to control circuit 68 responsive to the address value on lines LASTFA being greater than the highest previously-fetched address value as stored in latch 62.

Control circuit 68 is combinational or sequential logic used in controlling the operation of fetch address window maintenance unit 52, responsive to the signals received from comparators 64, 66, to the signal on line FAV indicating the presence of a valid fetch address on lines FA, and to the signal on line SMCFLUSH from SMC exception generator 56 (FIG. 2). Control circuit 68 also receives control signals (not shown) from elsewhere in microprocessor 10 that communicate pipeline flushes for reasons other than self-modifying code causes (including, for example, mispredicted branches and the like), and that communicate other conditions, such as machine reset, that require fetch address window maintenance unit 52 to be reset. It is contemplated that one of ordinary skill in the art will be readily able to implement control circuit 68 from the functional description provided herein.

In operation, fetch address window maintenance unit 52 is reset upon a pipeline flush or microprocessor reset, as may be communicated thereto by a valid signal on line SMC-FLUSH. In response to this signal, control circuit 68 issues a signal on line SELMT to cause multiplexers 61, 63 to select the high limit and low limit values, respectively, for application to latches 60, 62, and controls latches 60, 62 to store these limit values. At this point, the high limit value (e.g., 0xFFFFFFFF$_h$) is stored in latch 60 and presented on lines MINFA, while the low limit value (e.g., $0_h$) is stored in latch 62 and presented on lines MAXFA.

Upon the next fetch, control circuit 68 will receive a valid signal from fetch unit 26 on line FAV, signifying that a valid fetch address is present on lines FA. Control circuit 68 then controls latch 58 to store this value and to apply this value on lines LASTFA to multiplexers 61, 63, and to comparators 64, 66. In addition, control circuit 68 causes multiplexers 61, 63 to select the value on lines LASTFA for application to the input of latches 60, 62 at this time (but not yet storing this address value in latches 60, 62). The contents of latch 58 on lines LASTFA are then compared against the current contents of latches 60, 62 by comparators 64, 66. For this first fetch, since the high and low limits are stored in latches 60, 62, respectively, both of comparators 64, 66 will issue a signal to control circuit 68, responsive to which control circuit 68 will cause latches 60, 62 to store the current fetch address on lines LASTFA (presented via multiplexers 61, 63). This process will repeat for each succeeding valid fetch address, with the most recent fetch address stored in latch 58 and compared against the current contents of latches 60, 62. Each time that the last fetch address is outside of the window (i.e., less than the current minimum address or greater than the current maximum address), control circuit 68 will control the appropriate one of latches 60, 62 to store any new minimum or maximum address value.

Referring back to FIG. 2, lines LASTFA, MAXFA, MINFA are forwarded by fetch address window maintenance unit 52 to write comparators 54. In this example, SMC unit 50 has two write comparators $54_0$, $54_1$, respectively associated with the two load/store units $40_0$, $40_1$, of microprocessor 10. According to this embodiment of the invention, one write comparator 54 is associated with each load/store unit 40 present within microprocessor 10; accordingly, it is contemplated that different architectures, having more or fewer load/store units (or similar circuitry for generating memory writeback addresses) will have more or fewer write comparators corresponding thereto. According to this embodiment of the invention, each write comparator 54 also receives, in addition to the address values from fetch address window maintenance unit 52, new writeback addresses from its respective load/store unit 40. In this example, write comparator $54_0$ receives each new writeback address generated by load/store unit $40_0$ on lines LS0ADR, and write comparator $54_1$ receives each new writeback address generated by load/store unit $40_1$ on lines LS1ADR. As will be described in further detail hereinbelow, each write comparator $54_0$, $54_1$ compares the new writeback address value it receives on lines LS0ADR, LS1ADR, respectively, to the window of fetched instruction addresses on lines MINFA, MAXFA; write comparators $54_0$, $54_1$ each generate an exception signal on lines LS0SMCXCP, LS1SMCXCP, respectively, in the event that it determines that a new writeback address falls within the window (and thus may correspond to an instruction currently in the pipeline). Lines LS0SMCXCP, LS1SMCXCP are forwarded to scheduler 36, which will effect reserializing of microprocessor 10 using instruction exception mechanisms present in microprocessor 10 for other purposes, as is known in the art, followed by a restart at the next x86 instruction.

In this example of microprocessor 10, each of load/store units 40 have the capability of queuing writebacks, so that the pipelines do not have to stall in the event that buses are not available for writeback operations, or in the event of cache misses. According to the cached architecture of microprocessor 10, writes are typically first applied to level 0 microcache 18 and then, in the event of a cache miss to microcache 18, to level 1 data cache $16_d$. Level 1 data cache $16_d$ is used to receive writebacks even of instruction code, as level 1 instruction cache $16_i$ may not be written to by load/store units 40 in this architecture. In turn, if a cache miss occurs relative to level 1 cache $16_d$, the write proceeds to level 2 cache 11 (and then eventually to memory subsystem 5, if necessary). According to this example, level 2 cache 11 controls cache coherency in microprocessor 10. As a result, load/store units 40 can each maintain a pending level 0 writeback, and one pending level 1 writeback between the two load/store units 40 (i.e., only one of load/store units $40_0$, $40_1$ may have a pending level 1 writeback). This capability allows for subsequent writes to lower cache levels to take place even if an earlier write resulted in cache misses.

While this approach provides improved performance, a complexity may arise in the event of self-modifying code, particularly when being written to level 0 microcache 18 or to level 1 cache $16_d$ and thus in a transparent manner relative to the system cache coherency mechanism associated with level 2 cache 11. If, for example, a fetched instruction address corresponds to the address to which a writeback is pending and has not yet completed, the fetched instruction code would be in its state prior to modification, resulting in a program error. This situation is addressed according to the preferred embodiment of the invention, by write comparators 54, 55 having the additional function of comparing the most recently fetched instruction address, communicated thereto by fetch address window maintenance unit 52 on lines LASTFA, to the addresses of writebacks that remain pending, and which therefore have not been processed. Each of write comparators $54_0$, $54_1$ are implemented to generate an exception signal on lines LS0WBXCP, LS1WBXCP, respectively, in response to detecting a conflict between the last fetch address on lines LASTFA and pending writes to level 0 microcache 18; similarly, shared write comparator 55 generates an exception signal on line LLWBXCP upon detecting a conflict between the last fetch address on lines LASTFA and a pending write to level 1 cache $16_d$. The exception signals are forwarded to SMC exception generator circuitry 56, which generates an exception signal on line SMCWBXCP, which is forwarded to scheduler 36 for exception handling, including flushing of the pipeline, reserializing, and restart of execution. SMC exception generator 56 also produces a signal on line SMCFLUSH, which resets fetch address window maintenance unit 52, as will be described in further detail hereinbelow. SMC exception generator 56 may be constructed according to conventional techniques for exception generating and handling logic, as known in the art. Such exception generating and handling logic is typically present on conventional microprocessors, and may be readily adapted to accept SMC exceptions generated as described below.

Figure 4:
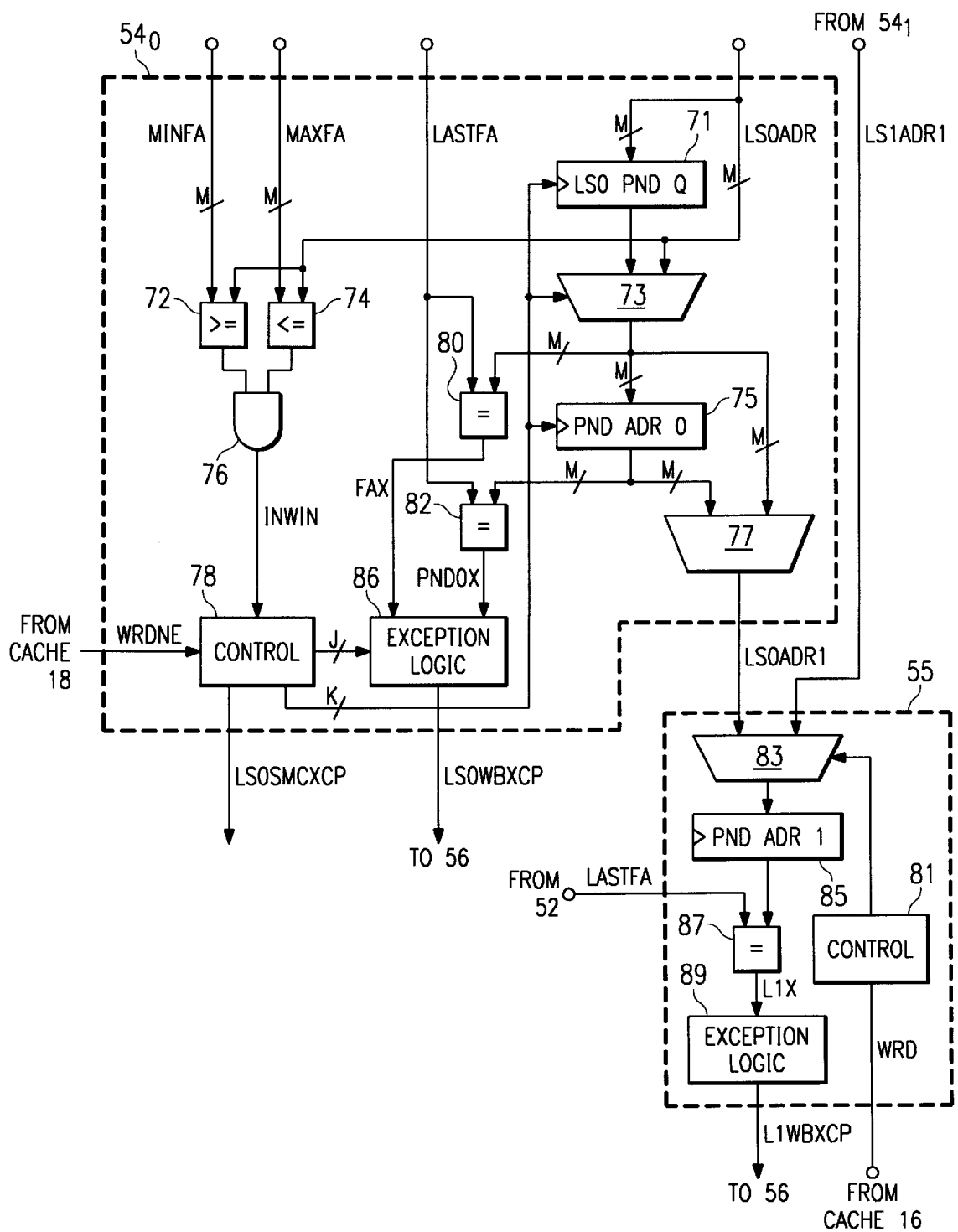
FIG. 4 is an electrical diagram, in block and schematic form, of one of the write comparators in the self-modifying code control circuitry of FIG. 2 according to the preferred embodiment of the invention.

Referring now to FIG. 4, the construction of an exemplary one of write comparators 54 in combination with shared write comparator 55, will now be described in detail. While FIG. 4 illustrates the construction of write comparator $54_0$, it is of course contemplated that write comparator $54_1$ will be similarly constructed. Write comparator $54_0$ receives new writeback addresses from load/store unit $40_0$ on lines LS0ADR, and applies this new address to queue latch 71 for storage, which frees lines LS0ADR for other transactions. Lines LS0ADR are also applied to one input of multiplexer 73, as is the output of queue latch 71. Under the control of control circuit 78, multiplexer 73 selects either the latched contents of queue latch 71 or the newly arriving writeback address on lines LS0ADR (if still valid) for application to its output, and to pending address register 75. This address will be stored in pending address register, or latch, 75 at such time as its writeback is processed to a pending state by load/store unit $40_0$, for a write to level 0 microcache 18.

The output of multiplexer 73 and the output of pending address register 75 are both applied to multiplexer 77. The output of multiplexer 77, on lines LS0ADR1, is forwarded to shared write comparator 55. Multiplexer 77 in write comparator $54_0$ is controlled by control circuit 78 to apply the address of a write to level 1 cache $16_d$ that is initiated by its associated load/store unit $40_0$. If this write is due to a cache miss at level 0 microcache 18, then the address selected by multiplexer 77 will be the current contents of pending address register 75; multiplexer 77 forwards addresses of writes that are originally directed to level 1 cache $16_d$ directly to shared write comparator 55 from the output of multiplexer 73.

Control circuit 78 receives signals on lines WRDNE from microcache 18 and other elements of the memory system of microprocessor 10, indicating the completion of write operations; as each write operation completes, control circuit 78 advances the writeback addresses along the sequence of registers 71, 75. While one pending writeback is contemplated for handling by write comparator 54 in this example, the number of pending address latches in write comparator 54 may differ in other architectures, according to the depth of cache levels handled by its associated load/store unit 40.

The current writeback address on lines LS0ADR is applied to one input of each of comparators 72, 74 as soon as valid, for comparison against the fetch address window. Comparator 72 receives lines MINFA from fetch address window maintenance unit 52 at its other input, and as such compares the current writeback address to the address on lines MINFA. Similarly, comparator 74 receives lines MAXFA from fetch address window maintenance unit 52 at its other input, and compares the current writeback address to the address on lines MAXFA. The outputs of comparators 72, 74 are applied to inputs of AND gate 76, the output of which is communicated to control circuit 78 on line INWIN. As will be further described below, the combination of comparators 72, 74 and AND gate 76 will perform the function of determining if the current writeback address potentially matches the address of an instruction in the pipeline.

Control circuit 78 is combinational or sequential logic for receiving the comparison result on line INWIN, and for generating an exception signal to scheduler 36 on line LS0SMCXCP in the event that the current writeback address is within the address range of fetched instructions (including the most recent fetch address as indicated on lines LASTFA). Control circuit 78 also receives control signals from its associated load/store unit $40_0$, and controls the storing of pending address values in registers 71, 75, and the selection performed by multiplexers 73, 77, according to the status of the pending writeback operations. It is contemplated that one of ordinary skill in the art will be readily able to construct control circuit 78, suitable for a particular implementation, by reference to the functions performed thereby as described herein.

The writeback address selected by multiplexer 73 is also applied to one input of equality comparator 80, which receives lines LASTFA from fetch address window maintenance unit 52 at its other input. Lines LASTFA are also applied to equality comparator 82, along with the contents of pending address register 75. Equality comparators 80, 82 communicate the results of their comparisons to exception logic 86 on lines FAX, PND0X, respectively. As will be further described below, equality comparators 80, 82 perform the function of determining if the most recent fetch address matches the address of a currently pending writeback operation.

Exception logic 86 is combinational or sequential logic, receiving signals from equality comparators 80, 82 on lines FAX, PND0X, respectively, and control signals from control circuit 78, for generating an exception signal on line LS0WBXCP to SMC exception generator 56 (FIG. 2) in the event that the most recent fetch address matches a writeback address in the pending writeback queue, corresponding to an instruction that has completed. It is contemplated that one of ordinary skill in the art will be readily able to implement exception logic 86 using conventional design techniques, based upon the functional description thereof provided herein.

In operation, upon receipt of a new writeback address from load/store unit $40_0$ on lines LS0ADR, write comparator 54 stores the address in queue latch 71, and forwards this address immediately to comparators 72, 74 for comparison with the fetch address window presented on lines MINFA, MAXFA. Comparator 72 generates a signal to one input of AND gate 76 responsive to the value of the current writeback address from multiplexer 73 being greater than or equal to the lowest linear address of instructions fetched since the last pipeline flush. Similarly, comparator 74 generates a signal to another input of AND gate 76 responsive to the current writeback address being less than or equal to the highest linear address of instructions fetched since the last pipeline flush. AND gate 76 generates a signal on line INWIN to control circuit 78 in the event that both comparators 72, 74, return a true signal, indicating that the current writeback address is within the address range of instructions fetched since the last pipeline flush, and may therefore be a modification to an instruction code that is in the pipeline. Conversely, if the current writeback address is not within the address range of instructions fetched since the last pipeline flush (i.e., line INWIN is low), then the writeback cannot possibly be a modification of an instruction code in the pipeline.

In response to the receipt of an active signal on line INWIN, control circuit 78 generates an exception signal on line LS0SMCXCP, which is communicated to scheduler 36 (FIG. 1) to initiate an exception sequence. The exception generated by AND gate 76 and control circuit 78 is, in this example, of the trap type, because the current writeback address may be in conflict with any one of the instructions currently in the pipeline (including, perhaps, an instruction currently in execution); accordingly, no instruction later than that corresponding to the current writeback is allowed to complete.

Write comparator $54_0$ also compares the most recent fetch address with the addresses of pending writebacks. Upon the fetch of an instruction, the fetch address on lines LASTFA are compared against the current writeback address by equality comparator 80, and against the addresses of pending writeback stored in registers 75 by equality comparator 82. If the most recent fetch address conflicts with the current writeback address equality comparator 80 asserts a signal on line FAX; similarly, if the most recent fetch address conflicts with a pending writeback address, equality comparator 82 asserts line PND0X. Responsive to an asserted signal on either line FAX or line PND0X, exception logic 86 generates an exception signal on line LS0WBXCP to SMC exception generator 56 (FIG. 2), which will in turn generate an exception to microprocessor 10 (i.e., to scheduler 36). According to the preferred embodiment of the invention, the exception generated by exception logic 86 in this instance is of an interrupt type, which allows those instructions currently being executed to complete before serializing and restarting the pipeline. This type of exception is permitted in this instance, because the conflict is known to be between the instruction that was most recently fetched (and not with a later instruction in the pipeline, as otherwise a trap would have been already generated by comparators 72, 74).

In shared write comparator 55, multiplexer 83 receives the output of multiplexer 77 of write comparator $54_0$ on lines LS0ADR1 at one input, and receives a similar pending address value on lines LS1ADR1 from write comparator $54_1$ at another input. Multiplexer 83 is controlled by control circuitry 81 to select the appropriate source of a pending write, for storage in register 85. As noted above, only one write to level 1 cache $16_d$, from either of load/store units 40, may be pending at any one time; control circuitry 81 receives control signals on lines WRD from level 1 cache $16_d$ to indicate the availability of a level 1 cache $16_d$ to receive a write, and the identity of the one of load/store units 40 to which access has been granted. The contents of register 85, corresponding to the address of a pending writeback to level 1 cache $16_d$, are forwarded to equality comparator 87, as is the current fetch address on lines LASTFA. Equality comparator 87, similarly as equality comparators 80, 82, compares the pending writeback address of register 85 against the fetch address on lines LASTFA and generates a signal on line L1X to exception logic 89. Exception logic 89 is constructed similarly as exception logic 86, for generating an exception signal on line SHWBSCP to SMC exception generator 56 in the event of a detected conflict.

In operation, shared write comparator 55 receives a new writeback address on lines LS0ADR1, LS1ADR1, at such time as a write to level 1 cache $16_d$ becomes pending; control circuitry 81 controls multiplexer 83 to select the appropriate address source, and the pending writeback address is stored in register 85 and presented to equality comparator 87. In response to receiving a new fetch address on lines LASTFA, equality comparator 87 determines if a conflict is present between this fetch address and the pending writeback address stored in register 85. Responsive to detecting a conflict, equality comparator 87 asserts a signal on line L1X to exception logic 89., in response to which exception logic 89 generates an exception signal on line LLWBXCP to SMC exception generator 56. SMC exception generator 56, as in the case of exceptions generated by write comparators 54, generates a signal on line SMCWBXCP to effect an exception of the interrupt type. The instructions currently in execution will then complete, and the pipeline will be serialized and restarted.

Figure 5:
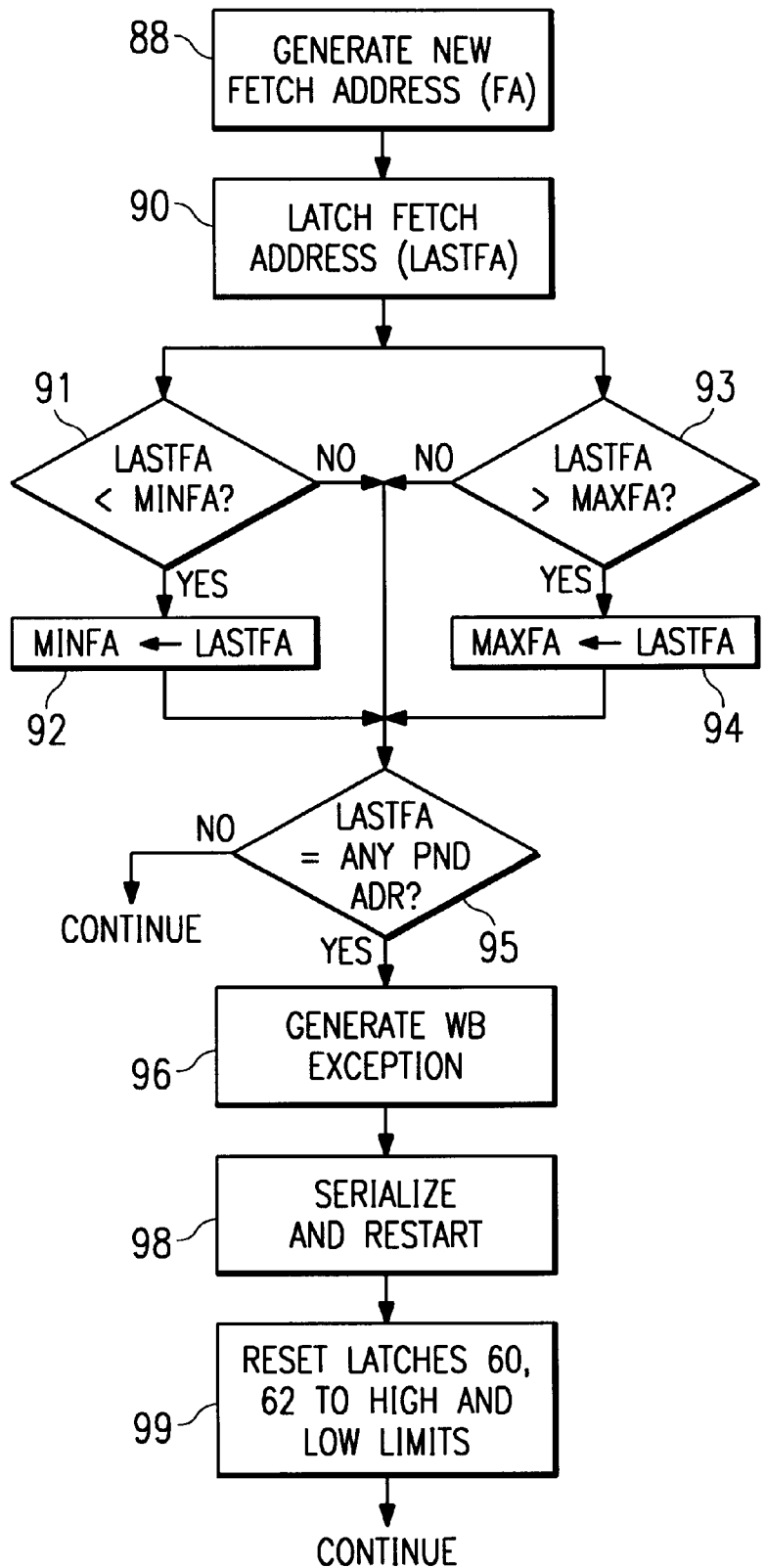
FIG. 5 is a flow chart illustrating the operation of the self-modifying code control circuitry of FIG. 2 in maintaining the fetch address window and in comparing the fetch address to pending writeback addresses, according to the preferred embodiment of the invention.

Referring now to FIG. 5 in combination with FIGS. 2 through 4, the overall operation of SMC unit 50, including fetch address window maintenance unit 52 and write comparators 54, in maintaining the fetch address window and in evaluating each fetch address for conflicts with pending writebacks will now be described.

The operation begins with process 88, in which fetch unit 26 generates a new fetch address, which is received on lines FA by fetch address window maintenance unit 52 in combination with a valid signal on line FAV. Fetch address window maintenance unit 52 latches the fetch address on lines FA into latch 58, and presents its contents on lines LASTFA to comparators 62, 64, which perform decisions 91, 93 in parallel with one another to determine if the current fetch address window is to be updated. As noted above, upon each pipeline flush or machine reset, the minimum fetch address is set to the high address limit of the memory space, and the maximum fetch address is set to the low address limit of the memory space, so that the first fetch after reset will begin establishment of a new fetch address window. If decision 91 determines that the most recent fetch address on lines LASTFA is below the lowest previous fetch address on lines MINFA, process 92 is performed by the fetch address window maintenance unit loading the value on lines LASTFA into latch 60. Similarly, if the most recent fetch address on lines LASTFA is above the highest previous fetch address on lines MAXFA, process 94 is performed by fetch address window maintenance unit 52 loading the value on lines LASTFA into latch 62. Upon completion of processes 92 or 94 (or both, as in the case of the first fetch after reset) as needed, control passes to decision 95.

Decision 95 is performed by write comparators $54_0$, $54_1$, and by shared write comparator 55, comparing the most recent fetch address on lines LASTFA against the addresses of pending and queued writebacks, for instructions that have been completed. As shown in FIG. 4 and as described hereinabove, decision 95 is performed by equality comparators 80, 82, in each of write comparators $54_0$, $54_1$ comparing the value on lines LASTFA against the most recent writeback address (on lines LS0ADR, LS1ADR, respectively, or queued in latch 71), and against the pending writeback address in register 75; decision 95 is also performed by comparator 87 in shared write comparator 55 comparing the most recent fetch address on lines LASTFA against the pending level 1 writeback address stored in register 85. If no conflict is detected by comparators 80, 82, 87, fetch of the instruction proceeds in the normal fashion. However, if a match is detected (decision 95 is YES), the instruction code of the instruction most recently fetched (by the address on lines LASTFA) may be out-of-date as not yet modified by one of the pending or queued writebacks not yet completed. Control then passes to process 96 in which exception logic 86 in one of write comparators 54, or exception logic 89 in shared write comparator 55, as the case may be, generates an exception signal to SMC exception generator 56, responsive to which SMC exception generator 56 issues an exception to scheduler 36 or such other appropriate exception circuitry in microprocessor 10, on line SMCWBXCP (FIG. 2). Process 98 is then performed by the appropriate circuitry in microprocessor 10 to handle the SMC exception. In this example, the conflict is between an instruction in the fetch stage and an instruction that has been completed, and as such the resulting exception may be implemented as an interrupt. Process 98 preferably includes such steps as completing the execution of instructions currently in execution, serializing the pipeline by effecting the writeback of all pending and completed results, and by restarting execution of the program, in the conventional manner for handling pipeline exceptions by which the fetch of the instruction causing the conflict will retrieve the modified instruction code. In addition, as shown in FIG. 5 by process 99, fetch address window maintenance unit 52 (FIG. 3) resets latches 60, 62 by storing the high limit value (e.g., $0xFFFFFFFF_h$) into latch 60 and the low limit value (e.g., $0_h$) into latch 62, which resets the fetch address window.

According to this preferred embodiment of the invention, therefore, each fetched address is analyzed to determine if the fetch address window is to be updated, by modifying either (or both) of the minimum and maximum fetched address values to include this most recent fetched address. In addition, each fetched address is analyzed against the addresses of each pending or queued writeback, to ensure that any instruction code modification intended by uncompleted writebacks are performed prior to fetching of the instruction.

Figure 6:
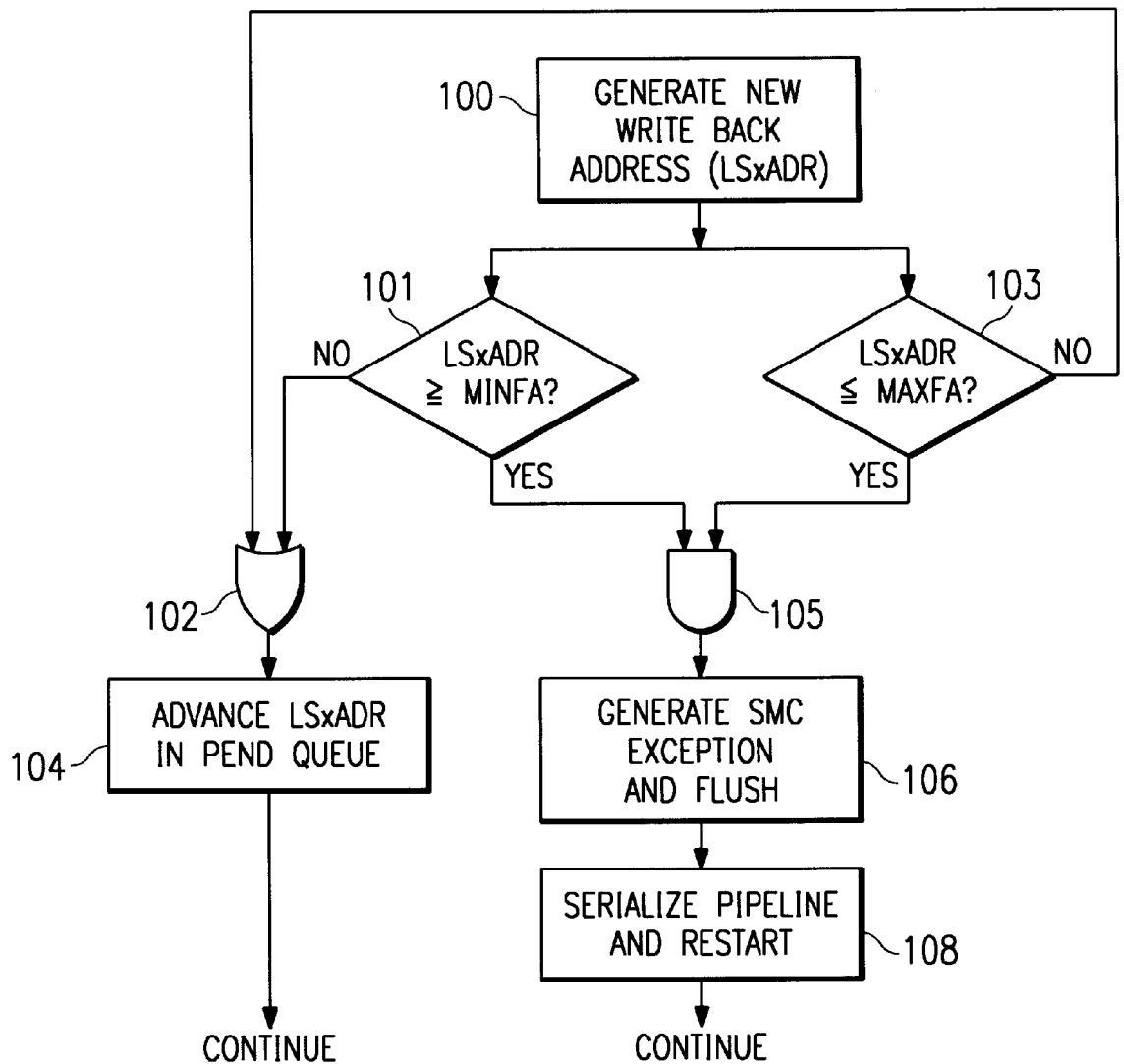
FIG. 6 is a flow chart illustrating the operation of the self-modifying code control circuitry of FIG. 2 in comparing writeback addresses to the fetch address window, according to the preferred embodiment of the invention.

Referring now to FIG. 6 in combination with FIGS. 1 through 4, the operation of SMC unit 50 responsive to receiving each new writeback address from the associated load/store units 40 will now be described. This process operates substantially asynchronously with the fetch window update and conflict check process of FIG. 5, in the sense that writebacks are not typically linked to fetching of instructions. In other words, each machine cycle may include either of, neither of, or both, a fetch and a writeback operation.

In process 100, one (or both) of load/store units $40_0$, $40_1$ generates a new writeback address as it completes the execution of an instruction; this new instruction is received by the corresponding one (or both) of write comparators 54 on its lines LS0ADR, LS1ADR (referred to generically in FIG. 6 as LSxADR), as the case may be. In decision 101, each of write comparators 54 compares this writeback address LSxADR to the lowest instruction address fetched since flush, as presented on lines MINFA; in decision 103, each of write comparators 54 compares this writeback address LSxADR to the highest instruction address fetched since flush, as presented on lines MAXFA. If the most recent writeback address LSxADR is either less than the lowest window address (MINFA) or greater than the highest window address (MAXFA), as indicated by OR process 102 (i.e., either of decisions 101, 103 are NO), the writeback cannot be a modification of any instruction currently in the pipeline. Control then passes to process 104, in which write comparators 54 will advance the newest address LSxADR in the pending write queue (i.e., registers 75, 85) as appropriate.

If, however, the most recent writeback address LSxADR is both greater than the lowest fetch address since flush (MINFA) and less than the highest fetch address since flush (MAXFA), as indicated by AND process 105 (i.e., both of decisions 101, 103 are YES), the most recent writeback may be a modification of an instruction that is currently in the pipeline. It should be noted that the determination that this writeback is within the window does not necessarily mean that a pipelined instruction is being modified, but instead only determines that modification of a pipelined instruction by this writeback is possible if the writeback were to proceed. In this event, control passes to process 106 in which control circuit 78 in the one of write comparators $54_0$, $54_1$ receiving the potentially conflicting writeback address generates asserts its respective exception signal line LS0SMCXCP, LS1SMCXCP to scheduler 36. The exception initiated in this case corresponds to a trap. Scheduler 36 then, in process 108, effects serializing of the pipeline, including completion of the conflicting writeback and flush of the pipeline, including instructions currently in execution. Flush of the pipeline is required in this event, considering that the identity of the specific pipelined instruction that may be modified is not known, and may include instructions as late as those in execution. The serializing and flush operations are, followed by restart of execution of the instructions, beginning with the fetch of the next instruction following the conflicting writeback. Execution then continues as before.

According to the present invention, many important advantages in the control of a microprocessor are obtained. One such advantage is the ability to detect and handle self-modifying code exceptions with a minimum amount of hardware and integrated circuit chip area. As is evident from the foregoing description, the preferred embodiment of the invention does not require storage of the address of each instruction in the pipeline, against which each writeback address is to be compared; such storage, as is included in conventional microprocessors, takes up a substantial amount of chip area, especially as pipelines become both deeper and wider (in the superscalar sense) in more advanced microprocessors. Instead, only the limits of the fetch address window need be stored. Further, only two comparisons are required according to the preferred embodiment of the invention, as compared with a comparison of the writeback address with the stored addresses of each instruction currently in the pipeline. The overhead time and circuitry required for this operation is therefore much reduced.

It is contemplated that the preferred embodiment of the invention may result in unnecessary pipeline flushes, considering that each writeback address is compared only against the window limits; it is thus conceivable that a writeback address may match an address that is within the window but which does not correspond to an instruction in the pipeline because the instruction has already completed, or was never fetched. However, it has been discovered in connection with the present invention that the frequency of pipeline flushes for other reasons (e.g., mispredicted branches) and also the proximity of program instructions reduces the likelihood of an unnecessary flush due to a false self-modifying code conflict to a level that, for most conventional architectures, is acceptable given the savings in chip area and performance.

The preferred embodiment of the invention provides the additional advantage of comparing each new fetch address against queued and pending writeback addresses, providing further assurance against errors from self-modifying code events, and enabling the ability to have a relatively deep writeback queue.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A microprocessor, comprising:
   a memory for storing instruction codes according to instruction addresses, and for storing operands;
   an instruction execution pipeline having a plurality of stages for processing a plurality of instructions in sequence, the plurality of stages comprising:
      a fetch unit, for addressing the memory with a fetch address to retrieve instruction codes for application to the instruction pipeline;
      at least one execution unit, for executing instructions; and
      a first load/store unit, for writing results from the execution unit into the memory at a destination writeback address; and
   self-modifying code detection circuitry coupled to the fetch unit and to the first load/store unit, comprising:
      a minimum latch for storing a lowest fetch address value;
      a maximum latch for storing a highest fetch address value; and
      a first write comparator, for comparing the destination writeback address to the contents of the minimum latch and the maximum latch, and for generating a flush signal to the instruction execution pipeline responsive to the destination writeback address being greater than or equal to the lowest fetch address value and less than or equal to the highest fetch address value
      a first update comparator, for comparing the fetch address to the contents of the minimum latch;
      a second update comparator for comparing the fetch address to the contents of the maximum latch; and
      control circuitry, coupled to the first and second update comparators, for controlling the minimum latch to store the fetch address responsive to the first update comparator determining that the fetch address is less than the lowest fetch address value stored in the minimum latch, and for controlling the maximum latch to store the fetch address responsive to the second update comparator determining that the fetch address is greater than the highest fetch address value stored in the maximum latch.

2. The microprocessor of claim 1, wherein the control circuitry is also for controlling both the minimum latch to store a high memory address limit and the maximum latch to store a low memory address limit, responsive to a pipeline flush.

3. The microprocessor of claim 1, wherein the memory comprises:
   instruction memory, for storing instruction codes at locations corresponding to fetch addresses from the fetch unit; and
   data memory, for storing operands.

4. The microprocessor of claim 1, further comprising:
   a bus interface unit, coupled on one side to the instruction execution pipeline and to the memory, and coupled on the other side to an external bus; and
   external subsystems coupled to the external bus.

5. A microprocessor, comprising:
   a memory for storing instruction codes according to instruction addresses, and for storing operands;
   an instruction execution pipeline having a plurality of stages for processing a plurality of instructions in sequence, the plurality of stages comprising:
      a fetch unit, for addressing the memory with a fetch address to retrieve instruction codes for application to the instruction pipeline;
      at least one execution unit, for executing instructions; and
      a first load/store unit, for writing results from the execution unit into the memory at a destination writeback address; and
   self-modifying code detection circuitry coupled to the fetch unit and to the first load/store unit, comprising:
      a minimum latch for storing a lowest fetch address value;
      a maximum latch for storing a highest fetch address value; and
      a first write comparator, for comparing the destination writeback address to the contents of the minimum latch and the maximum latch, and for generating a flush signal to the instruction execution pipeline responsive to the destination writeback address being greater than or equal to the lowest fetch address value and less than or equal to the highest fetch address value
      wherein the first write comparator generates an exception signal to the instruction execution pipeline responsive to the destination writeback address being greater than or equal to the lowest fetch address value and less than or equal to the highest fetch address value;
      and wherein the instruction execution pipeline performs a pipeline flush responsive to receiving the exception signal.

6. A microprocessor, comprising:
   a memory for storing instruction codes according to instruction addresses, and for storing operands;
   an instruction execution pipeline having a plurality of stages for processing a plurality of instructions in sequence, the plurality of stages comprising:
      a fetch unit, for addressing the memory with a fetch address to retrieve instruction codes for application to the instruction pipeline;
      at least one execution unit, for executing instructions; and
      a first load/store unit, for writing results from the execution unit into the memory at a destination writeback address; and
   self-modifying code detection circuitry coupled to the fetch unit and to the first load/store unit, comprising:
      a minimum latch for storing a lowest fetch address value;

a maximum latch for storing a highest fetch address value; and a first write comparator, for comparing the destination writeback address to the contents of the minimum latch and the maximum latch, and for generating a flush signal to the instruction execution pipeline responsive to the destination writeback address being greater than or equal to the lowest fetch address value and less than or equal to the highest fetch address value wherein the instruction execution pipeline further comprises:

a second load/store unit for writing results from the execution unit into the memory at a destination writeback address; and wherein the self-modifying code detection circuitry further comprises:

a second write comparator, for comparing the destination writeback address from the second load/store unit to the contents of the minimum latch and the maximum latch, and for generating a flush signal to the instruction execution pipeline responsive to the destination writeback address of the second load/store unit being greater than or equal to the lowest fetch address value and less than or equal to the highest fetch address value.

7. A microprocessor, comprising:

a memory for storing instruction codes according to instruction addresses, and for storing operands;

an instruction execution pipeline having a plurality of stages for processing a plurality of instructions in sequence, the plurality of stages comprising:

a fetch unit, for addressing the memory with a fetch address to retrieve instruction codes for application to the instruction pipeline;

at least one execution unit, for executing instructions; and a first load/store unit, for writing results from the execution unit into the memory at a destination writeback address; and self-modifying code detection circuitry coupled to the fetch unit and to the first load/store unit, comprising:

a minimum latch for storing a lowest fetch address value;

a maximum latch for storing a highest fetch address value; and a first write comparator, for comparing the destination writeback address to the contents of the minimum latch and the maximum latch, and for generating a flush signal to the instruction execution pipeline responsive to the destination writeback address being greater than or equal to the lowest fetch address value and less than or equal to the highest fetch address value wherein the first write comparator comprises:

a first window comparator, for comparing the destination writeback address to the contents of the minimum latch;

a second window comparator, for comparing the destination writeback address to the contents of the maximum latch; and comparator control circuitry, for generating the flush signal responsive to the combination of the first window comparator determining that the destination writeback address is greater than or equal to the lowest fetch address value and the second window comparator determining that the destination writeback address is less than or equal to the highest fetch address value.

8. The microprocessor of claim 7, wherein the first write comparator is coupled to the fetch unit to receive the fetch address therefrom;

wherein the first write comparator further comprises:

a first equality comparator, for comparing the fetch address to the destination writeback address, and for generating a signal to the comparator control circuitry responsive to the fetch address matching the destination writeback address.

9. The microprocessor of claim 8, wherein the first write comparator further comprises:

a pending writeback address latch, for storing a pending destination writeback address for a write operation by the first load/ store unit that has not yet completed;

a second equality comparator, for comparing the fetch address to the pending destination writeback address, and for generating a signal to the comparator control circuitry responsive to the fetch address matching the pending destination writeback address.

10. The microprocessor of claim 9, wherein the comparator control circuitry comprises:

exception logic, for generating an exception request signal responsive to the second equality comparator determining that the fetch address matches the pending destination writeback address.

11. A microprocessor, comprising:

a memory for storing instruction codes according to instruction addresses, and for storing operands;

an instruction execution pipeline having a plurality of stages for processing a plurality of instructions in sequence, the plurality of stages comprising:

a fetch unit, for addressing the memory with a fetch address to retrieve instruction codes for application to the instruction pipeline;

at least one execution unit, for executing instructions; and a first load/store unit, for writing results from the execution unit into the memory at a destination writeback address; and self-modifying code detection circuitry coupled to the fetch unit and to the first load/store unit, comprising:

a minimum latch for storing a lowest fetch address value;

a maximum latch for storing a highest fetch address value; and a first write comparator, for comparing the destination writeback address to the contents of the minimum latch and the maximum latch, and for generating a flush signal to the instruction execution pipeline responsive to the destination writeback address being greater than or equal to the lowest fetch address value and less than or equal to the highest fetch address value wherein the first write comparator is coupled to the fetch unit and to the first load/store unit, and comprises:

a first window comparator, for comparing the destination writeback address to the contents of the minimum latch;

a second window comparator, for comparing the destination writeback address to the contents of the maximum latch; and comparator control circuitry, for generating the flush signal responsive to the combination of the first window comparator determining that the destination writeback address is greater than or equal to the lowest fetch address value and the second window comparator determining that the destination writeback address is less than or equal to the highest fetch address value;

a first equality comparator, for comparing the fetch address to the destination writeback address, and for generating a current conflict signal responsive to the fetch address matching the destination writeback address;

a first pending writeback address latch, for storing a first pending destination writeback address for a write operation by the first load/store unit that has not yet completed;

a second equality comparator, for comparing the fetch address to the first pending destination writeback address, and for generating a first pending conflict signal responsive to the fetch address matching the first pending destination writeback address; and exception control circuitry, coupled to the first and second equality comparators, for generating a flush signal responsive to either the current conflict signal or the first pending conflict signal.

12. The microprocessor of claim 11, further comprising:

a second load/store unit, for writing results from the execution unit into the memory at a destination writeback address; and a second write comparator coupled to the fetch unit and to the second load/store unit, comprising:

a first window comparator, for comparing the destination writeback address to the contents of the minimum latch;

a second window comparator, for comparing the destination writeback address to the contents of the maximum latch; and comparator control circuitry, for generating the flush signal responsive to the combination of the first window comparator determining that the destination writeback address is greater than or equal to the lowest fetch address value and the second window comparator determining that the destination writeback address is less than or equal to the highest fetch address value;

a first equality comparator, for comparing the fetch address to the destination writeback address, and for generating a current conflict signal responsive to the fetch address matching the destination writeback address;

a first pending writeback address latch, for storing a first pending destination writeback address for a write operation by the first load/store unit that has not yet completed;

a second equality comparator, for comparing the fetch address to the first pending destination writeback address, and for generating a first pending conflict signal responsive to the fetch address matching the first pending destination writeback address; and exception control circuitry, coupled to the first and second equality comparators, for generating a flush signal responsive to either the current conflict signal or the first pending conflict signal.

13. The microprocessor of claim 12, further comprising:

a shared write comparator, coupled to the first and second write comparators, comprising:

select circuitry, for selecting a pending destination writeback address from the first and second write comparators;

a second pending writeback address latch, for storing the selected pending destination writeback address;

a shared equality comparator, for comparing the fetch address to the stored selected pending destination writeback address, and for generating a second pending conflict signal responsive to the fetch address matching the stored selected pending destination writeback address; and shared control circuitry, coupled to the third equality comparator, for generating a flush signal responsive to receiving the second pending conflict signal.

14. The microprocessor of claim 11, further comprising:

a bus interface unit, coupled on one side to the instruction execution pipeline and to the memory, and coupled on the other side to an external bus; and external subsystems coupled to the external bus.

15. A method of operating a microprocessor to detect self-modifying code conflicts, comprising the steps of:

executing an instruction;

generating a writeback address to which the results of the executing step are to be written into memory;

comparing the writeback address to a minimum fetch address and to a maximum fetch address, the minimum fetch address corresponding to a lowest fetch address for instructions received since a pipeline flush, and the maximum fetch address corresponding to a highest fetch address for instructions received since the pipeline flush;

responsive to the comparing step determining that the writeback address is both greater than or equal to the minimum fetch address and less than or equal to the highest fetch address, initiating a pipeline flush generating a current fetch address to fetch an instruction code for execution by the microprocessor;

comparing the current fetch address to the minimum fetch address;

responsive to the fetch address being less than the minimum fetch address, setting the minimum fetch address equal to the current fetch address;

comparing the current fetch address to the maximum fetch address; and responsive to the fetch address being greater than the maximum fetch address, setting the maximum fetch address equal to the current fetch address.

16. The method of claim 15, wherein the step of initiating a pipeline flush comprises:

generating an exception signal;

responsive to the exception signal, flushing the pipeline.

17. The method of claim 15, further comprising:

generating a current fetch address to fetch an instruction code for execution by the microprocessor;

comparing the current fetch address to the writeback address;

responsive to the comparing step determining that the current fetch address matches the writeback address, initiating a pipeline flush.

18. The method of claim 17, further comprising:

storing at least one pending writeback address corresponding to destination memory addresses of write operations that are not yet complete;

comparing the current fetch address to each of the at least one pending writeback addresses;

responsive to the comparing step determining that the current fetch address matches any of the at least one pending writeback addresses, initiating a pipeline flush.

19. The method of claim 18, wherein the step of initiating a pipeline flush comprises:

completing the write operation corresponding to the pending writeback address; and then fetching an instruction code, from a memory location corresponding to the current fetch address, for execution by the microprocessor.

20. The method of claim 19, further comprising:

beginning execution of a second instruction prior to the comparing step; and wherein the initiating step further comprises:

completing execution of the second instruction prior to the fetching step.

21. A method of operating a microprocessor to detect self-modifying code conflicts, comprising the steps of:

executing an instruction;

generating a writeback address to which the results of the executing step are to be written into memory;

comparing the writeback address to a minimum fetch address and to a maximum fetch address, the minimum fetch address corresponding to a lowest fetch address for instructions received since a pipeline flush, and the maximum fetch address corresponding to a highest fetch address for instructions received since the pipeline flush;

responsive to the comparing step determining that the writeback address is both greater than or equal to the minimum fetch address and less than or equal to the highest fetch address, initiating a pipeline flush responsive to a pipeline flush, setting the minimum fetch address to a high limit value and setting the maximum fetch address to a low limit value.

* * * * *